United States Patent
Anand et al.

(10) Patent No.: US 9,479,517 B2
(45) Date of Patent: Oct. 25, 2016

(54) SERVICE GOVERNANCE FOR DISTRIBUTED SYSTEMS

(71) Applicant: Wal-Mart Stores, Inc., Bentonville, AR (US)

(72) Inventors: Raj Anand, Sunnyvale, CA (US); Sambit Dikshit, Bangalore (IN)

(73) Assignee: WAL-MART STORES, INC., Bentonville, AR (US)

( * ) Notice: Subject to any disclaimer, the term of this patent is extended or adjusted under 35 U.S.C. 154(b) by 253 days.

(21) Appl. No.: 14/193,479

(22) Filed: Feb. 28, 2014

(65) Prior Publication Data

US 2015/0249701 A1    Sep. 3, 2015

(51) Int. Cl.
| | | |
|---|---|---|
| G06F 15/16 | (2006.01) |
| G06F 15/177 | (2006.01) |
| G06F 7/00 | (2006.01) |
| G06F 17/00 | (2006.01) |
| G06F 17/30 | (2006.01) |
| H04L 29/06 | (2006.01) |
| H04L 29/08 | (2006.01) |

(52) U.S. Cl.
CPC ............. *H04L 63/123* (2013.01); *H04L 67/16* (2013.01); *H04L 63/12* (2013.01)

(58) Field of Classification Search
CPC ....... H04L 67/00; H04L 67/06; H04L 67/10; H04L 67/16; H04L 67/18; H04L 67/2819; H04L 67/2823; H04L 63/12; H04L 63/20; H04L 63/123; H04L 41/5058; H04L 41/0896; H04L 61/1541
USPC ......... 709/201, 217, 223–224, 228; 707/723, 707/766, 769, 794

See application file for complete search history.

(56) References Cited

U.S. PATENT DOCUMENTS

| | | | |
|---|---|---|---|
| 2007/0168479 A1* | 7/2007 | Bean | H04L 67/16 709/223 |
| 2010/0125618 A1* | 5/2010 | Dutta | G06F 8/10 707/822 |
| 2010/0205224 A1* | 8/2010 | Palanisamy | G06F 17/30604 707/803 |
| 2010/0274793 A1* | 10/2010 | Koskimies | G06Q 10/10 707/754 |
| 2012/0047483 A1* | 2/2012 | Amit | G06F 17/30861 717/104 |
| 2012/0158906 A1* | 6/2012 | Bailey | G06F 9/5055 709/217 |
| 2013/0103676 A1* | 4/2013 | Kwan | G06F 17/30864 707/723 |

* cited by examiner

Primary Examiner — Farzana Huq
(74) Attorney, Agent, or Firm — Bryan Cave LLP (57) ABSTRACT

Example systems and methods for service governance for distributed and cloud-based systems are described. In one implementation, a method extracts a plurality of service manifest files associated with a web service from a service artifact. The method also validates the plurality of service manifest files, and publishes the plurality of service manifest files in a service registry.

17 Claims, 5 Drawing Sheets

SERVICE GOVERNANCE FOR
DISTRIBUTED SYSTEMS

TECHNICAL FIELD

The present disclosure relates to methods and systems for service governance for distributed systems.

BACKGROUND

Service lifecycle includes evolution phrases of services, namely from inception through to retirement. Service governance, as a part of service lifecycle, monitors, reports, and/or manages processes associated with the development, deployment, operations and management of the services, and updates/establishes information associated with the processes. However, conventional techniques fail to enforce service governance in an implicit and transparent way. There is a need for a solution that enables an underlying service platform to enable service onboard a governance platform.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Embodiments of the present disclosure describe an approach/solution to achieve automated service governance using a self-service model in a distributed and cloud-based system associated with Service Oriented Architecture (SOA) or Application Programming Interface (API) oriented Architecture. Embodiments of the present disclosure enable governance of a portion or the complete service/API lifecycle, for example, from the development stage to deployment of the service/API in a cloud-based system, wherein the deployable artifact may include a service/API contract encapsulating a portion or all of the metadata about the service. The metadata may then be used to publish the service to a service registry, therefore bringing the service under the purview of the service governance and enabling effective administration and monitoring of the service.

Embodiments of the present disclosure are designed to enforce service governance as part of the service lifecycle in an implicit and transparent way, and therefore enable the underlying service platform to enable service onboard the governance platform. This onboard design is agnostic and transparent to the underlying service implementation. Compared to conventional techniques, embodiments of the present disclosure provide advantages such as, for example, a uniform model to define API, ability to define inter-operability between systems, ability to define Quality of Service (QOS) and service policies, governance at different layers (e.g., API gateway layer, client layer and service layer), visibility of utilization of services via effective monitoring of the services, re-usability of services, etc.

Figure 1:
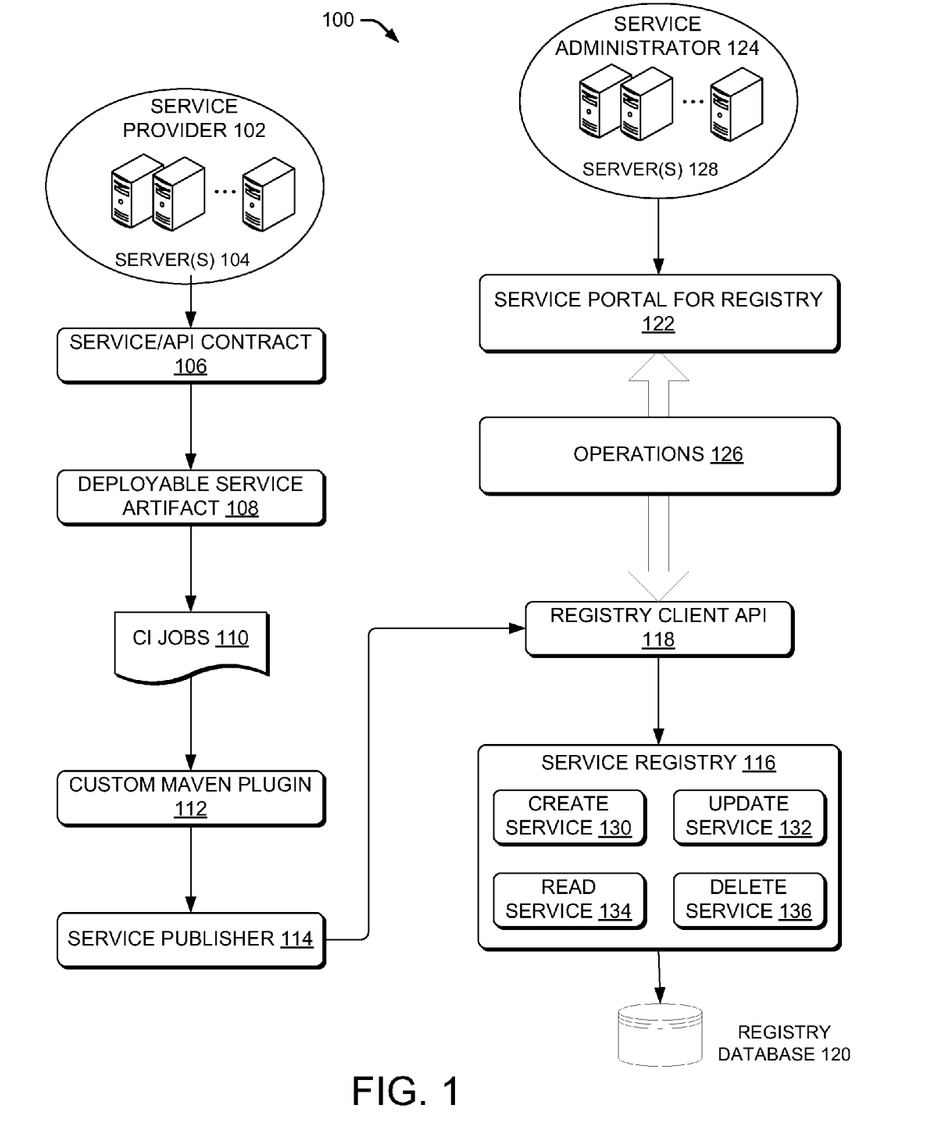
FIG. 1 is a block diagram depicting a computing scheme within which an example embodiment of the present disclosure may be implemented.

FIG. 1 is a block diagram depicting a computing scheme 100 within which an example embodiment of the present disclosure may be implemented. Computing scheme 100 illustrates service governance based on a self-service model in a distributed and/or cloud-based system associated with SOA or API Oriented Architecture. Service governance is related to SOA governance, and the function of service governance may include monitoring, reporting, and/or managing processes associated with the development, deployment, operations and management of services, and updating/establishing information associated with the processes.

Computing scheme 100 may include a service provider 102 that, via server(s) 104, builds a set of services (e.g., web services) to fulfill business goals. Service provider 102 may define a service/API contract 106 in one or more files (e.g., an Extensible Markup Language (XML) file). For example, service provider 102 may provide service metadata as well as QOS and policy references in the service/API contract. In some embodiments, the one or more files may contain metadata about the service such as, for example, a name, a version, an owner, a service end-point, a contract uniform resource locator (URL), etc., that are associated with the service. Service end-points may facilitate communication associated with the service. In some instances, the service end-points may specify the service contract that defines which methods of the service class may be accessed via the service end-point, and an individual service end-point may expose a different set of methods. The service end-point may also define a binding that specifies how a client communicates with the service and the network address where the service end-point resides. An example AIP contract in XML is provided below.

```
<?xml version="1.0" encoding="UTF-8"?>
<sm:ServiceManifest xmlns:sm="http://platform.walmart.com/soa/service/manifest/model"
xmlns:xsi="http://www.w3.org/2001/XMLSchema-instance"
xsi:schemaLocation="http://platform.walmart.com/soa/service/manifest/model
../../../../soari-manifest-model/src/main/resources/schema/service-manifest-schema.xsd ">
    <sm:serviceArtifactId>ship-price-app</sm:serviceArtifactId>
  <sm:serviceName>ShippingService</sm:serviceName>
    <sm:serviceDesc>Shipping service</sm:serviceDesc>
    <sm:serviceOwner>rajanand@walmartlabs.com</sm:serviceOwner>
    <sm:serviceStatus>ACTIVE</sm:serviceStatus>
    <sm:serviceEnvironment>DEFAULT</sm:serviceEnvironment>
    <sm:serviceCategory>PROC</sm:serviceCategory>
    <sm:serviceUsageDomain>B2C</sm:serviceUsageDomain>
    <sm:serviceUsageType>INTERNAL</sm:serviceUsageType>
    <sm:notificationRequested>true</sm:notificationRequested>
    <sm:notificationFor>
        <sm:notifyFor>ADD_SERVICE</sm:notifyFor>
        <sm:notifyFor>UPDATE_SERVICE_VERSION</sm:notifyFor>
    </sm:notificationFor>
    <sm:notificationTypes>
            <sm:notificationType>EMAIL</sm:notificationType>
    </sm:notificationTypes>
    <sm:serviceVersions>
     <sm:serviceVersion>
      <sm:version>1.0.0</sm:version>
      <sm:status>ACTIVE</sm:status>
      <sm:endPointURL>http://d1-shipprsusvc.glb.dev.walmart.com/ship-pricing/</sm:endPointURL>
        <sm:alternateEndpointURLs>
         <sm:altEndPointURL>http://d2-shipprsusvc.glb.dev.walmart.com/ship-pricing/</sm:altEndPointURL>
        </sm:alternateEndpointURLs>
        <sm:contractURL>http://d1-shipprsusvc.glb.dev.walmart.com/ship-pricing?_wadl</sm:contractURL>
        <sm:apiDocument>https://confluence.walmart.com/display/PGSSHIPPR/PG+Item+-
+Ship+Pricing+Home</sm:apiDocument><!--  Confluence link of the API docs for this
service version-->
        <sm:apiCodeReference>https://gecgithub01.walmart.com/services/ship-pricing</sm:apiCodeReference>
```

```
    <sm:availabilityTier>TIER1</sm:availabilityTier>
    <sm:activationStartDate>2001-12-31 12:00:00</sm:activationStartDate>
    <sm:qosParameters>
        <sm:qosParameter    name="QOS_ALLOWED_CONTENT_TYPES"
value="application/json" />
        <sm:qosParameter         name="ALLOWED_CONSUMERS"
value="1001,1002" />
    </sm:qosParameters>
    <sm:policies>
        <sm:policy name="AllowedContentTypePolicy" />
        <sm:policy name="AllowedConsumerPolicy" />
    </sm:policies>
    </sm:serviceVersion>
</sm:serviceVersions>
</sm:ServiceManifest>
```

Service provider 102 may also package service/API contract 106 in a deployable service artifact 108 (e.g., in a class path of the service artifact). A service artifact may include an object created by one or more relevant users (e.g., service providers, service consumers, etc.) to specify various characteristics of a service. Examples of service artifacts include a document of understanding, a business requirement document, a specification of non-functional requirements, a specification of a priority of the service, service metadata, etc. Service metadata may include information that specifies the behavior, structure, operation of the service. For example, service metadata may include a service name, a status storing the operation status of the service, a timestamp associate the operation of the service, one or more configuration documents associated with the service, a service description language document, etc.

In some embodiments, service provider 102 may create service manifest XML files by adding service metadata (e.g., a service endpoint and contract URL). These manifest files may then be packaged in the final deployable artifact. A service manifest file may include a document listing content of a distribution and/or location in, for example, software packaging such that the contents of the distribution package may be validated. In some instances, altering the content may invalidate the checksums in the manifest file. In some embodiments, the service manifest file (e.g., an XML file) may be generated by adding service metadata including detailed information such as, for example, an end-point, a contract URL, etc. that is associated with the service.

In some embodiments, an individual manifest file may exist for an individual service environment. Service environments may include various environments in a service lifecycle. Service lifecycle may include the evolution phases of a service through which it passes (e.g., from inception through to termination). In some embodiments, a service lifecycle may include a modeling process, a assembling or building process, a deploying process, a managing process, etc. For instance, the modeling process may include creating, documenting, prioritizing business requirements. The assembling process may include defining, approving, and monitoring the service building. Also, the deploying process may include evaluating and executing functional and performance test associated with the service. The managing process may include monitoring the service and generating reports on service.

In some embodiments, the service environments may include a developing environment, quality assurance (Q/A) environment, a staging environment, a production environment, etc. In these instances, development environment may be used by the developers (e.g., programmers, configurators, etc.) as they work on individual programs, apply program patches or updates, or turn/configure new functionality. Q/A environment may be used by the developers and certain users (e.g., service consumers) to test the migrated changes in a pseudo production environment to ensure that the changes actually work correctly. Staging environment may be used to test the application in a production environment without having users access the application yet. This environment may also be used to make sure security settings are correct and that other services on servers do not interfere with the application. Production environment may be an actual environment used by the service consumers (e.g., companies, institutions, organizations, etc.) for the processing needs.

The release of deployable service artifact 108 may be initiated by continuous integration (CI) jobs 110 (e.g., CI applications). Continuous integration may include techniques that merge developer working copies with a shared mainline several times in a predetermined time period in software engineering. In some embodiments, as an automated component of a service governance system, a continuous delivery (CD) unit may be responsible for packaging, unit testing, building and subsequent deployment of the service artifact to both non-production as well as production environments, using maven jobs. For example, techniques of CD may include automated testing, continuous integration and continuous deployment facilitating software to be developed to a high standard and easily packaged and deployed to test environments, etc.

Computing scheme 100 may also include a custom maven plugin 112, which is triggered as part of the CI jobs 110. In some embodiments, custom maven plugin 112 may be an interface to SOA and/or APIs. Maven is a software project management tool used by software developers to manage software projects, and to centrally archive, within a maven repository, those artifacts/binaries that comprise a project, and to then use the artifacts. During the CI for the maven artifact, custom maven plugin 112 may extract the service manifest files from deployable service artifact 108 (e.g., the artifact class path), and pass on to a service publisher 114 to publish these manifest files.

In some embodiments, custom maven plugin 112 may call service publisher 114 during the post release phase of maven builds.

As a component of the service governance system, service publisher 114 may read, validate and eventually publish information associated with the service manifest file to a service registry 116 via a registry client API 118. Service registry 116 may be associated with a registry database 120 to enable service provider 102 to register services and service consumers to search for target services to fulfill business goals. A registered service may be stored in registry database 120, which stores information such as, for example, a service end-point, a service contract URL, a service owner, quality of service parameters, etc.

In some embodiments, service registry 116 may function as a listing of the services available and a listing of the addresses for invoking the services. Service registry 116 may also facilitate coordination of versions of a service. For example, service consumers and providers may specify which version they need or have. Service registry 116 may also manage version compatibility, track compatibility between versions, and enumerate the providers of a desired version or compatible version. Service registry 116 may support service states (e.g., test and deprecated), and provide the services with these states available to consumers.

In some embodiments, service publisher 114 may be accessed either as a Representational State Transfer (REST) service or as a library component. The REST service may include a service of which architectural principles by which developers may design services that focus on a system's resources, including how resource states are addressed and transferred over HTTP by a wide range of clients written in different languages.

In some embodiments, through registry client API 118 and a service portal for registry 122, a service administrator 124 may communicate with service registry 116 to perform operations 126 using server(s) 128 associated with service administrator 124. Accordingly, service registry 116 may proceed with operations such as, for example, creating service 130, updating service 132, reading service 134, deleting service 138, etc.

In some embodiments, service administrator 124 may manage the service (e.g., monitoring the service and/or generating reports on the services) based on the service manifest published by the service publisher 114.

Service portals, such as service portal for registry 122, may connect to a process control system of computing process, collect parameter data from process field devices, identify, sort, and store the collected parameter data, transmit the stored parameter data to a remote monitoring system for analysis, etc. For example, service portal for registry 122 may include an apparatus and/or software for collecting, transmitting and analyzing parameter data between server 128 and service registry 116.

Figure 2:
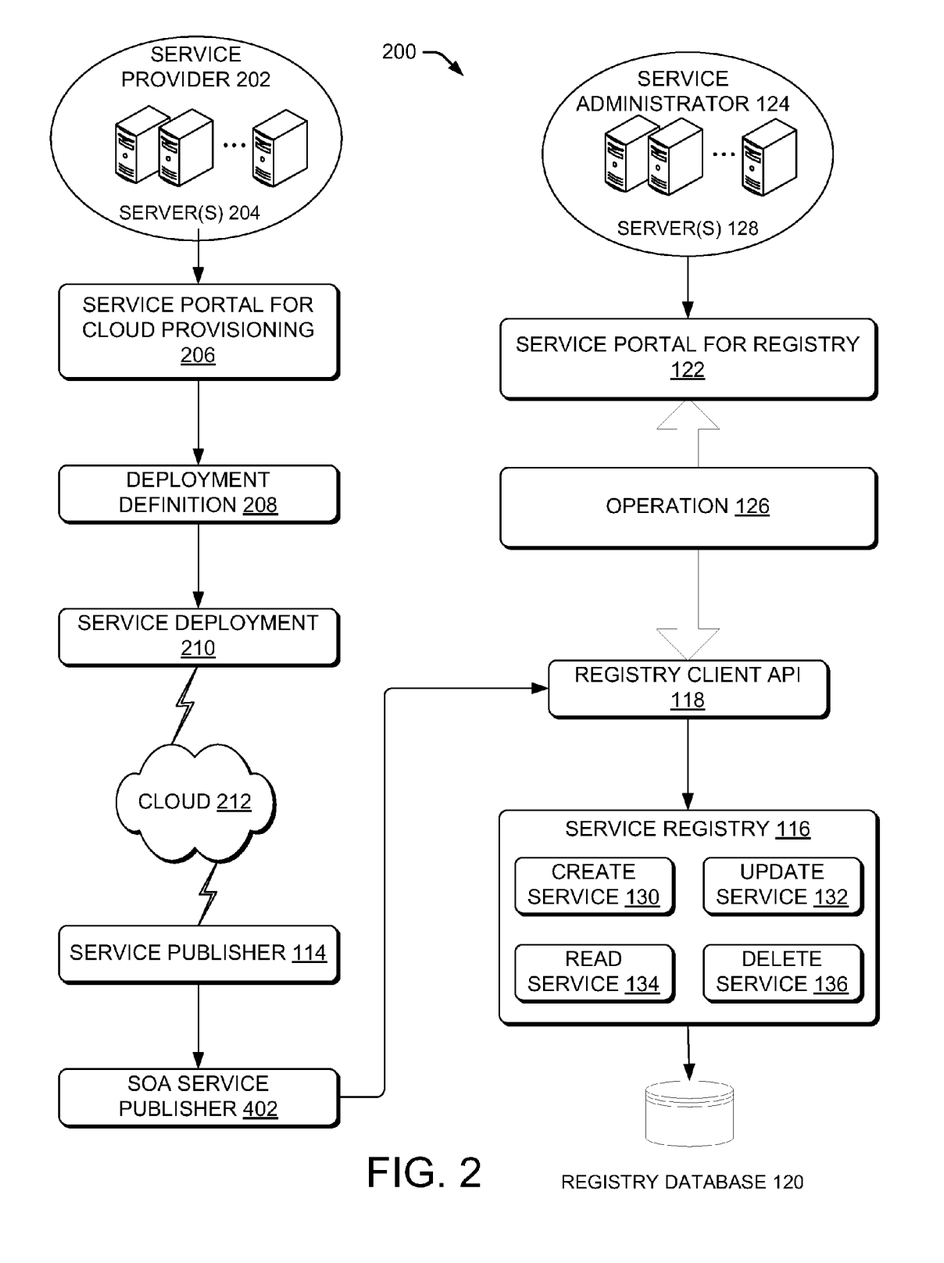
FIG. 2 is a block diagram depicting another computing scheme within which an example embodiment of the present disclosure may be implemented.

FIG. 2 is a block diagram depicting another computing scheme 200 within which an example embodiment of the present disclosure may be implemented. Computing scheme 200 may include a service provider 202 and associated server(s) 204. Through a cloud provisioning service portal 206, service provider 202 may add information associated with service registry 116 in a deployment definition 208. The deployment definition 208 may include service contract parameters associated with the service. Service registry 116 may have placeholders for these service contract parameters. Values for these parameters may be defined at service provisioning time. For example, before service deployment 210 in a cloud 212, service provider 202 may provide the service contract parameters.

After the service is deployed in cloud 212, a cloud provisioning service may generate service contract file (e.g., a XML file) out of the contracts parameters. The service contract file may then be passed on to service publisher 114 to enable service onboard the governance platform.

Service publisher 114 may publish information associated with service contract parameters. For example, service publisher 114 may publish one or more service manifest files to service registry 116 via a registry client API 118. The service manifest files include service contract parameters. Service registry 116 may be associated with registry database 120 to enable service provider 102 to register services and potential consumers to search for target services to fulfill business goals.

In some embodiments, through registry client API 118 and service portal for registry 122, service administrator 124 may communicate with service registry 116 to perform operations 126. Accordingly, service registry 116 may proceed with operations such as, for example, creating service 130, updating service 132, reading service 134 deleting service 138, etc. Service portal for registry 122 may include an apparatus and/or software for collecting, transmitting and analyzing parameter data between server 128 and service registry 116.

Figure 3:
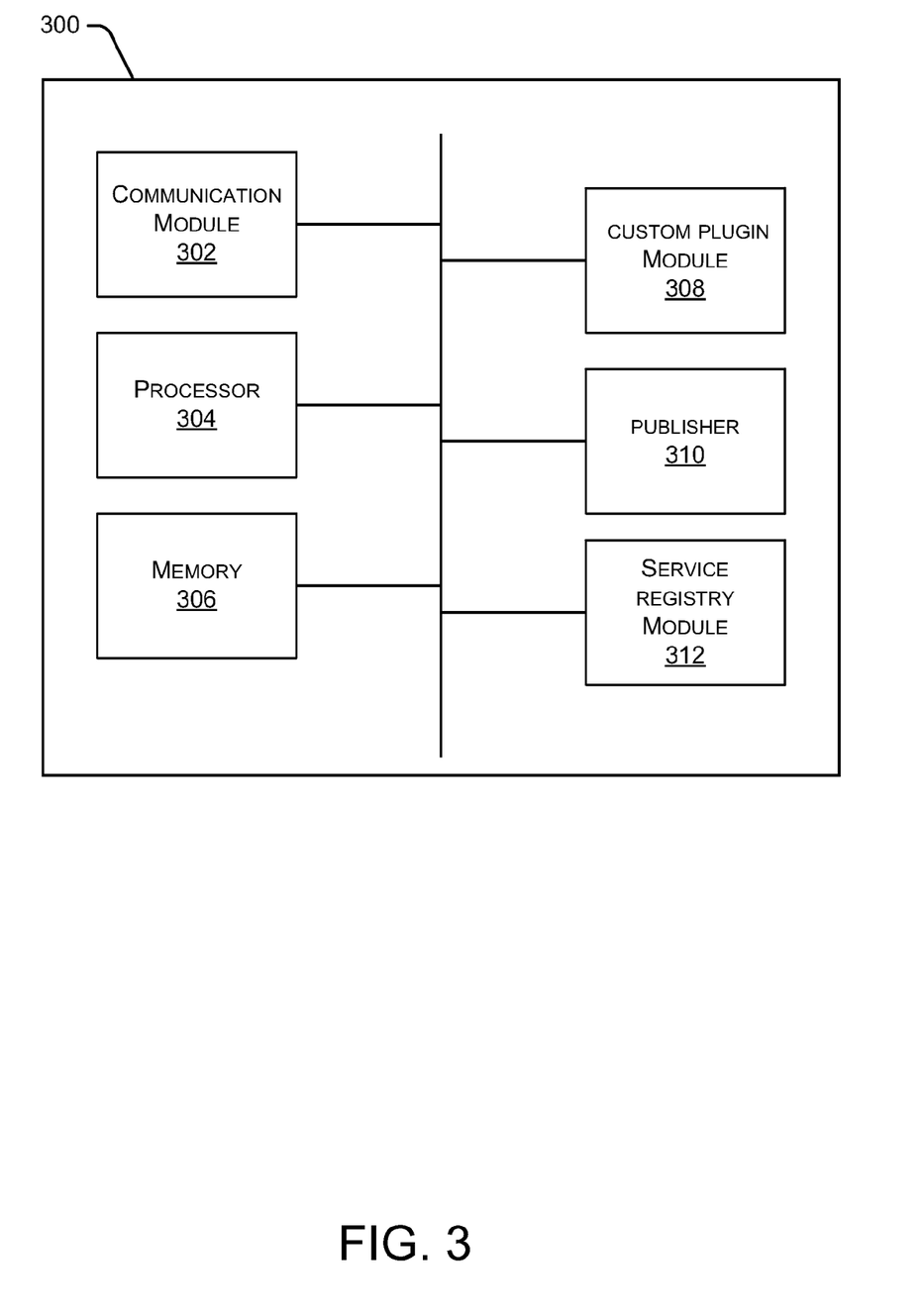
FIG. 3 is a block diagram depicting an embodiment of a computing device configured to implement systems and methods of the present disclosure.

FIG. 3 is a block diagram depicting an embodiment of a computing device configured to implement systems and methods of the present disclosure. Computing device 300 performs various functions related to service governance, as discussed herein. In some embodiments, computing devices 300 may include ones of computing devices that cooperatively implement the functions described herein. Computing device 300 may include a communication module 302, a processor 304, and a memory 306. Communication module 302 allows computing device 300 to communicate with other systems, such as communication networks, other servers, etc. Processor 304 executes one or more sets instructions to implement the functionality provided by computing device 300. Memory 306 stores these instructions as well as other data used by processor 304 and other modules contained in computing device 300.

Computing device 300 may also include a custom plugin module 308 configured to extract multiple service manifest files associated with a web service from a service artifact. The multiple service manifest files include service metadata corresponding to multiple service environments. In some embodiments, the service metadata may include at least one of a service name of the web service, a status storing an operation status of the web service, a timestamp associated with an operation of the web service, one or more configuration documents associated with the web service, or a service description language document of the web service. In some embodiments, custom plugin module 308 may build the service artifact using maven techniques by packaging the multiple service manifest files.

In some embodiments, an individual service manifest file of the plurality of service manifest files may correspond to an individual service environment of the plurality of service environments that include a development environment, a quality assurance environment, a stating environment, and a production environment that are associated with the web service. In these instances, the individual service manifest file may be written in XML.

Computing device 300 may also include a publisher 310 configured to validate the multiple service manifest files and to publish the multiple service manifest files in a service registry. In some embodiments, the publisher 310 may conduct a Java XML binding (JAXB) read of the plurality of service manifest files before validating the plurality of service manifest files. In some embodiments, publisher 310 may determine whether the service registry includes a service call of the web service. In response to a determination that the service registry includes the service call, publisher 310 may update the service call in the service registry. In response to a determination that the service registry does not include the service call, publisher 310 may create an entry associated with the web service in the service registry.

Computing device 300 may further include a service registry module 312 configured to enable a service provider to register services and a service consumer to search for target services. In some embodiments, the service registry module 312 may also manage version compatibility, track compatibility between versions, and enumerate the providers of a desired version or compatible version to a service consumer, an entity that calls/invokes web-services to fulfill their business goals.

Figure 4:
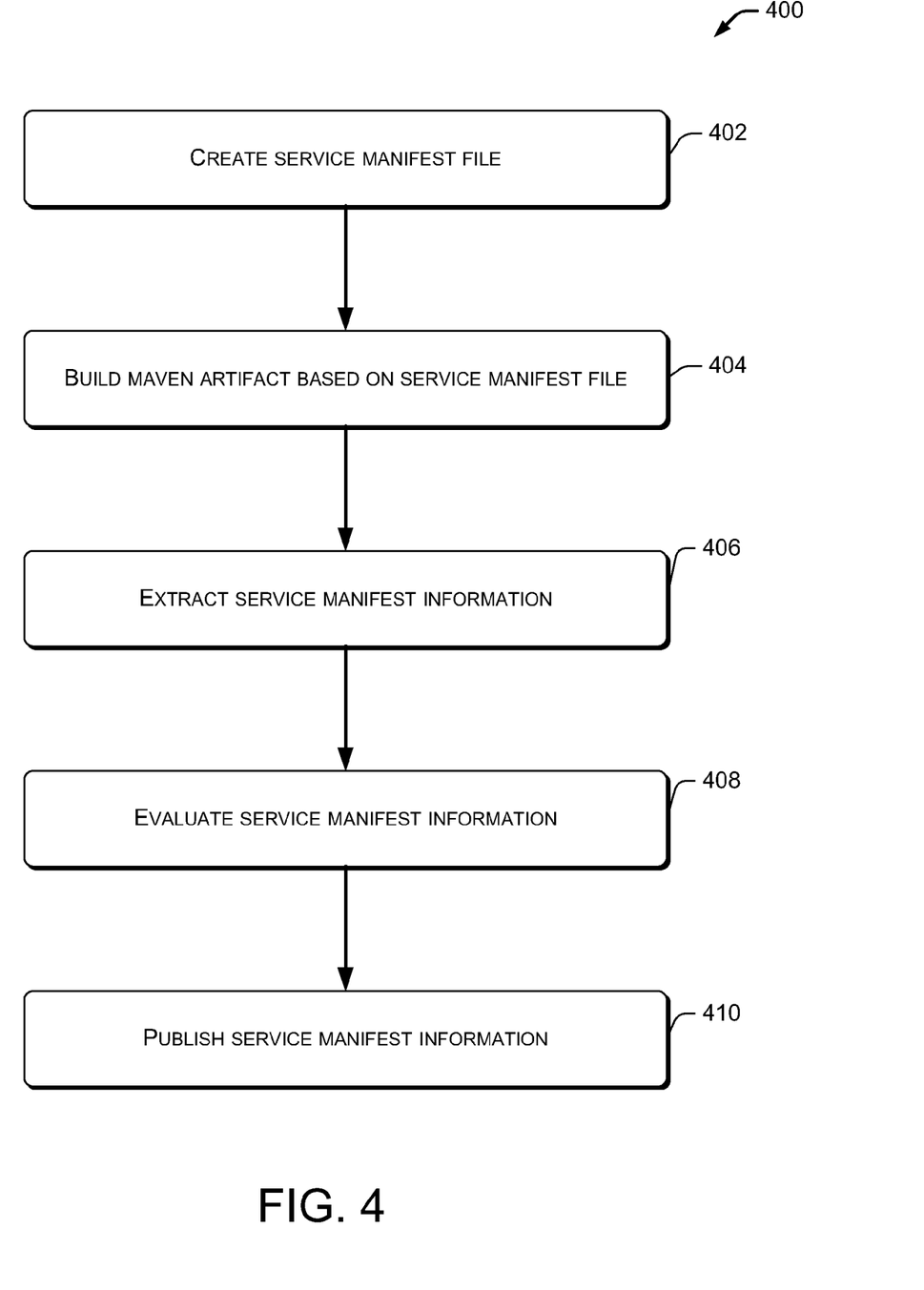
FIG. 4 is a flowchart diagram of an embodiment of a continuous delivery (CD) based process of the present disclosure.

FIG. 4 is a flowchart diagram of an embodiment of a continuous delivery (CD) based process of the present disclosure. Example process 400 includes one or more operations, actions, or functions. Although illustrated as discrete blocks, various blocks may be divided into additional blocks, combined into fewer blocks, or eliminated, depending on the desired implementation. Process 400 may be implemented by one or more processors associated with a service governance system including, for example, computing device 300, server 104, and/or server 128, as shown in FIGS. 1, 2, and 3.

At 402, the service governance system may create one or more service manifest files associated with a web service. The one or more service manifest files may include service metadata corresponding to a plurality of service environments. The service metadata may include at least one of a service name of the web service, a status storing an operation status of the web service, a timestamp associated with an operation of the web service, one or more configuration documents associated with the web service, or a service description language document of the web service. In some embodiments, an individual service manifest file of one or more service manifest files may correspond to an individual service environment of the multiple service environments that include a development environment, a quality assurance environment, a stating environment, and a production environment that are associated with the web service. In some instances, the individual service manifest file may be written in XML.

At 404, the service governance system may build maven artifact based on the one or more service manifest files. In some embodiments, the service governance system may build a service artifact using maven techniques by packaging the plurality of service manifest files. During the building for the maven artifact, custom maven plugin 112 of the service governance system may extract the service manifest from the artifact class path, and then pass on to a manifest publisher component (e.g., service publisher 114) of the service governance system.

At 406, the service governance system may extract service manifest information. In some embodiments, the service governance system may extract multiple service manifest files associated with the web service from the service artifact.

At 408, the service governance system may validate the service manifest information (e.g., the multiple service manifest files). In some embodiments, the service governance system may validate the plurality of service manifest files based on one or more predetermined criteria associated with at least one of a service end-point, a contract URL, or a valid service environment of the web service. In some embodiments, the service governance system may conduct a Java XML binding (JAXB) read of the plurality of service manifest files before validating the plurality of service manifest files.

At 410, the service governance system may publish the service manifest files information in a service registry. In some embodiments, the service governance system may determine whether the service registry includes a service call of the web service. In response to a determination that the service registry includes the service call, the service governance system may update the service call in the service registry. In response to a determination that the service registry does not include the service call, the service governance system may create an entry associated with the web service in the service registry.

Figure 5:
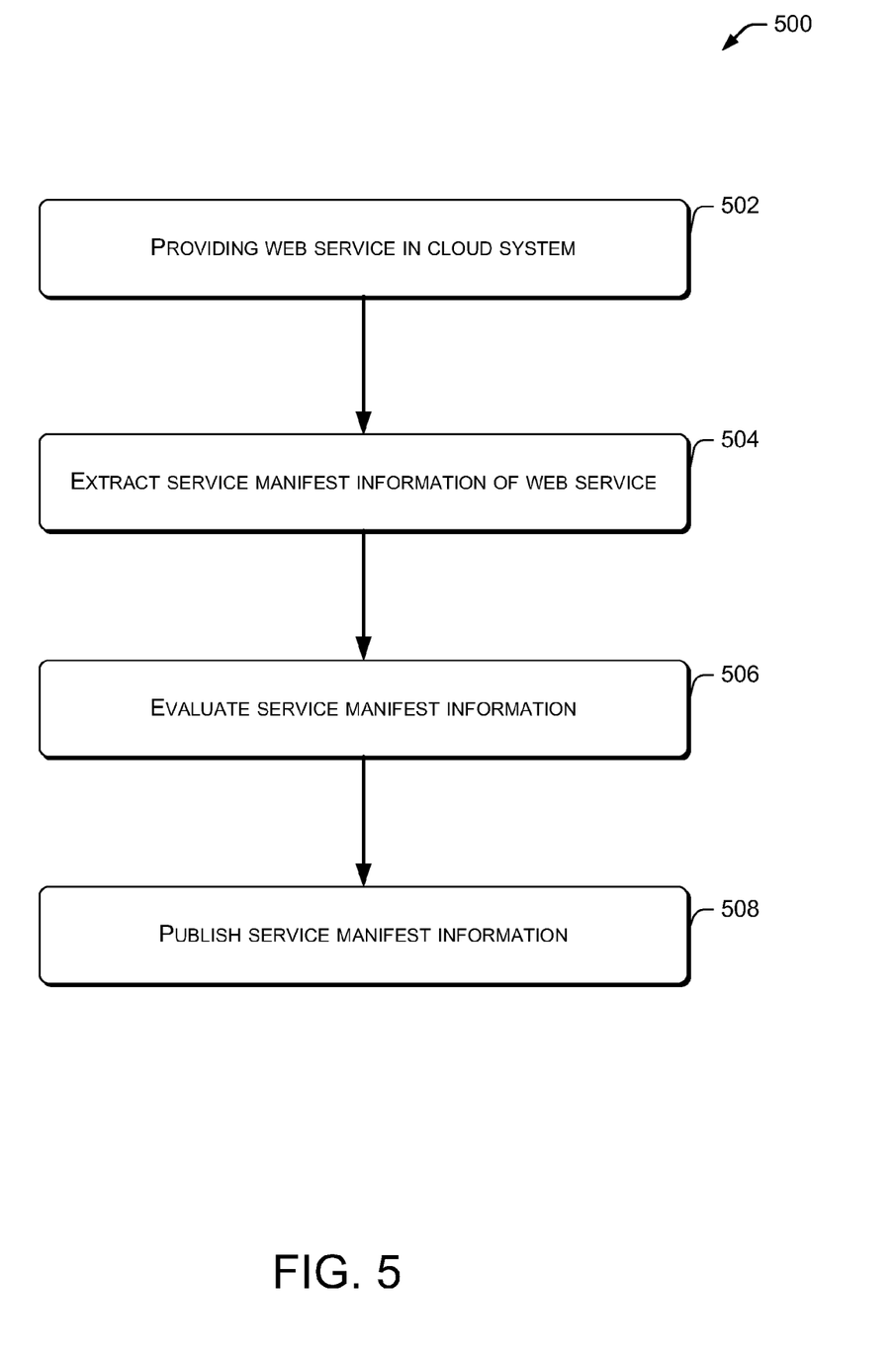
FIG. 5 is a flowchart diagram of an embodiment of a cloud provisioning service-based process of the present disclosure.

FIG. 5 is a flowchart diagram of an embodiment of a cloud provisioning service-based process of the present disclosure. Example process 500 includes one or more operations, actions, or functions. Although illustrated as discrete blocks, various blocks may be divided into additional blocks, combined into fewer blocks, or eliminated, depending on the desired implementation. Process 500 may be implemented by one or more processors associated with a service governance system including, for example, computing device 300, server 204, and/or server 128, as shown in FIGS. 1, 2, and 3.

At 502, a service governance system may provide a web service in a cloud computing system based on one or more service contract parameters associated with the web service. Through a cloud provisioning service portal 206, the governance system may add information associated with service registry 116 in a deployment definition 208 associated with the web service. Values for these parameters may be defined at service provisioning time. For example, before service deployment 210 in a cloud 212, service provider 202 may fill up service contract parameters.

In some embodiments, after the service is deployed in cloud 212, the service governance system may generate service contract file (e.g., a XML file) out of the contracts parameters. The service contract file may then be passed on to service publisher 114 to avail the web service.

At 504, the service governance system may extract service manifest information. In some embodiments, the service governance system may extract multiple service manifest files associated with the web service from the service artifact.

At 506, the service governance system may validate the service manifest information (e.g., the multiple service manifest files). In some embodiments, the service governance system may validate the plurality of service manifest files based on one or more predetermined criteria associated with at least one of a service end-point, a contract uniform resource locator (URL), or a valid service environment of the web service. In some embodiments, the service governance system may conduct a Java XML binding (JAXB) read of the plurality of service manifest files before validating the plurality of service manifest files.

At 508, the service governance system may publish the service manifest files information in a service registry. In some embodiments, the service governance system may determine whether the service registry includes a service call of the web service. In response to a determination that the service registry includes the service call, the service governance system may update the service call in the service registry. In response to a determination that the service registry does not include the service call, the service governance system may create an entry associated with the web service in the service registry.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
   placing a service under purview of an automated service governance system by:
   initiating release of a service artifact by a continuous integration job;
   extracting, by one or more processors and during execution of the continuous integration job, a plurality of service manifest files associated with a web service from the service artifact, the plurality of service manifest files comprising service metadata corresponding to a plurality of service environments, and at least one service manifest file of the plurality of service manifest files corresponds to an individual service environment of the plurality of service environments that comprises:
   a development environment associated with the web service;
   a quality assurance environment associated with the web service;
   a stating environment associated with the web service; and
   a production environment associated with the web service;
   validating the plurality of service manifest files based on one or more predetermined criteria associated with at least one of:
   a service end-point;
   a contract uniform resource locator (URL); or
   a valid service environment of the web service; and
   publishing the plurality of service manifest files in a service registry associated with the automated service governance system by:
   determining whether the service registry comprises a service call of the web service;
   in response to determining that the service registry comprises the service call, updating the service call in the service registry;
   in response to determining that the service registry does not comprise the service call, creating an entry associated with the web service in the service registry; and
   passing the plurality of service manifest files in the service registry to a service publish to publish the plurality of service manifest files.

2. The method of claim 1, wherein:
   the service metadata includes at least one of:
   a service name of the web service;
   a status storing an operation status of the web service;
   a timestamp associated with an operation of the web service;
   one or more configuration documents associated with the web service; or
   a service description language document of the web service.

3. The method of claim 1, wherein:
   the at least one service manifest file of the plurality of service manifest files is written in an Extensible Markup Language (XML).

4. The method of claim 1, further comprising:
   building the service artifact using maven techniques by packaging the plurality of service manifest files.

5. The method of claim 1, further comprising:
   conducting a Java XML binding (JAXB) read of the plurality of service manifest files before validating the plurality of service manifest files.

6. A method comprising:
   providing, by one or more processors, a web service in a cloud computing system based on one or more service contract parameters associated with the web service;
   generating a service contract file based on the one or more service contract parameters;
   placing a service under purview of an automated service governance system by:
   initiating release of a service artifact by a continuous integration job, the service artifact comprising the service contract file;
   extracting, during execution of the continuous integration job, a plurality of service manifest files associated with the web service from the service contract file, the plurality of service manifest files comprising service metadata corresponding to a plurality of service environments, and at least one service manifest file of the plurality of service manifest files corresponds to an individual service environment of the plurality of service environments that comprises:
   a development environment associated with the web service;
   a quality assurance environment associated with the web service;
   a stating environment associated with the web service; and
   a production environment associated with the web service;
   validating the plurality of service manifest files based on one or more predetermined criteria associated with at least one of:
   a service end-point;
   a contract uniform resource locator (URL); or
   a valid service environment of the web service; and
   publishing the plurality of service manifest files in a service registry associated with the automated service governance system by:
   determining whether the service registry comprises a service call of the web service;
   in response to determining that the service registry comprises the service call, updating the service call in the service registry; and
   in response to determining that the service registry does not comprise the service call, creating an entry associated with the web service in the service registry; and
   passing the plurality of service manifest files in the service registry to a service publish to publish the plurality of service manifest files.

7. The method of claim 6, wherein:
   the service metadata includes at least one of:
   a service name of the web service;
   a status storing an operation status of the web service;
   a timestamp associated with an operation of the web service;
   one or more configuration documents associated with the web service; or
   a service description language document of the web service.

8. The method of claim 6, wherein:
   the service contract file is written in an Extensible Markup Language (XML).

9. One or more non-transitory computer readable media comprising computer-executable instructions that, when executed by a computer, perform acts comprising:
 placing a service under purview of an automated service governance system by:
  initiating release of a service artifact by a continuous integration job;
 extracting, during execution of the continuous integration job, a plurality of service manifest files associated with a web service from the service artifact, the plurality of service manifest files comprising service metadata corresponding to a plurality of service environments, and at least one service manifest file of the plurality of service manifest files corresponds to an individual service environment of the plurality of service environments that comprises:
  a development environment associated with the web service;
  a quality assurance environment associated with the web service;
  a stating environment associated with the web service; and
  a production environment associated with the web service;
 validating the plurality of service manifest files based on one or more predetermined criteria associated with at least one of:
  a service end-point;
  a contract uniform resource locator (URL); or
  a valid service environment of the web service; and
 publishing the plurality of service manifest files in a service registry associated with the automated service governance system by:
  determining whether the service registry comprises a service call of the web service;
  in response to determining that the service registry comprises the service call, updating the service call in the service registry; and
  in response to determining that the service registry does not comprise the service call, creating an entry associated with the web service in the service registry; and
  passing the plurality of service manifest files in the service registry to a service publish to publish the plurality of service manifest files.

10. The one or more non-transitory computer readable media of claim 9, wherein:
 the service metadata corresponds to a plurality of service environments and comprises:
  at least one of:
   a service name of the web service;
   a status storing an operation status of the web service;
   a timestamp associated with an operation of the web service;
   one or more configuration documents associated with the web service; or
   a service description language document of the web service.

11. The one or more non-transitory computer readable media of claim 9, wherein:
 the at least one service manifest file is written in an Extensible Markup Language (XML).

12. The method of claim 1, wherein:
 the service registry manages version compatibility between a service consumer and a service provider.

13. The method of claim 1, wherein:
 the service metadata includes at least one of:
  a service name of the web service;
  a status storing an operation status of the web service;
  a timestamp associated with an operation of the web service;
  one or more configuration documents associated with the web service; or
  a service description language document of the web service;
 the at least one service manifest file of the plurality of service manifest files is written in an Extensible Markup Language (XML);
 the service registry manages version compatibility between a service consumer and a service provider;
 the method further comprises:
  building the service artifact using maven techniques by packaging the plurality of service manifest files; and
  conducting a Java XML binding (JAXB) read of the plurality of service manifest files before validating the plurality of service manifest files.

14. The method of claim 6, wherein:
 the service registry manages version compatibility between a service consumer and a service provider.

15. The method of claim 6, wherein:
 the service metadata includes at least one of:
  a service name of the web service;
  a status storing an operation status of the web service;
  a timestamp associated with an operation of the web service;
  one or more configuration documents associated with the web service; or
  a service description language document of the web service;
 the service contract file is written in an Extensible Markup Language (XML);
 the service registry manages version compatibility between a service consumer and a service provider.

16. The one or more non-transitory computer readable media of claim 9, wherein:
 the service registry manages version compatibility between a service consumer and a service provider.

17. The one or more non-transitory computer readable media of claim 9, wherein:
 the service metadata corresponds to a plurality of service environments and comprises:
  at least one of:
   a service name of the web service;
   a status storing an operation status of the web service;
   a timestamp associated with an operation of the web service;
   one or more configuration documents associated with the web service; or
   a service description language document of the web service;
 the at least one service manifest file is written in an Extensible Markup Language (XML); and
 the service registry manages version compatibility between a service consumer and a service provider.

\* \* \* \* \*